United States Patent [19]

Kearney et al.

[11] 4,276,861
[45] Jul. 7, 1981

[54] ENGINE KNOCK CONTROL WITH KNOCK PULSE DURATION ADJUSTMENT

[75] Inventors: Mark B. Kearney; Kenneth D. Mowery, both of Kokomo; L. Joseph Pechous, Carmel, all of Ind.

[73] Assignee: General Motors Corporation, Detroit, Mich.

[21] Appl. No.: 149,644

[22] Filed: May 14, 1980

[51] Int. Cl.³ .......................... F02P 5/04; F02B 33/00
[52] U.S. Cl. ..................................... 123/425; 123/435
[58] Field of Search ............................... 123/425, 435

[56] References Cited

U.S. PATENT DOCUMENTS

| | | | |
|---|---|---|---|
| 4,002,155 | 1/1977 | Harned | 123/425 |
| 4,061,116 | 12/1977 | Saida | 123/425 |
| 4,063,538 | 12/1977 | Powell | 123/425 |
| 4,111,035 | 9/1978 | West | 123/425 |
| 4,153,020 | 5/1979 | King | 123/425 |
| 4,236,491 | 12/1980 | Hahori | 123/425 |

*Primary Examiner*—Ronald B. Cox
*Attorney, Agent, or Firm*—Robert M. Sigler

[57] ABSTRACT

A vehicle mounted, spark ignited, internal combustion engine subject to bursts of ringing knock vibration of varying duration corresponding to knock of varying intensity includes apparatus effective to generate pulses in response to the bursts and of corresponding duration. Further apparatus delays the trailing edge of each pulse by a common predetermined duration to favorably reduce the ratio of the durations of such pulses before application to apparatus effective to control a knock reducing parameter of the engine. The reduced ratio of duration between short and long pulses provides more uniform control over the total range of knock intensity. The engine may also include apparatus to delay the leading edge of each pulse by a common predetermined duration to eliminate short noise pulses and improve the knock signal to noise ratio. If so, this apparatus is inserted prior to the trailing edge delay apparatus and the common predetermined duration of the latter is greater than that of the former.

6 Claims, 4 Drawing Figures

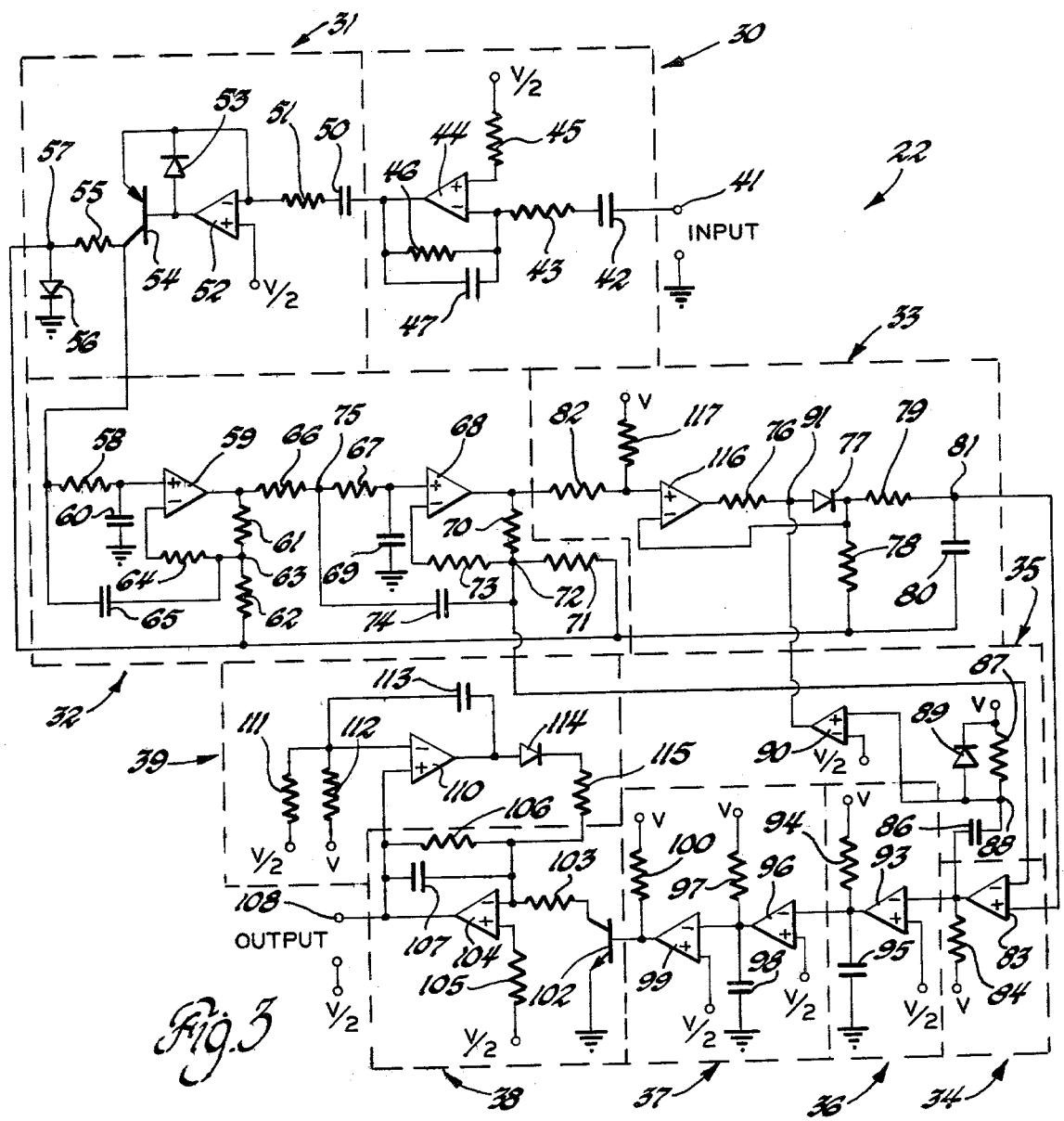
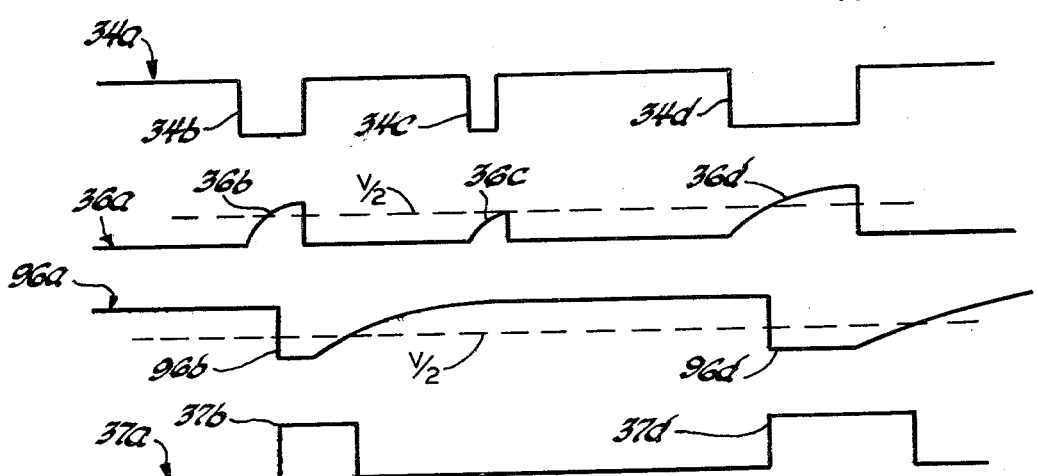
Fig. 3
Fig. 4

ENGINE KNOCK CONTROL WITH KNOCK PULSE DURATION ADJUSTMENT

BACKGROUND OF THE INVENTION

This invention relates to spark ignited internal combustion engines of the type including means to sense engine knock and control an engine variable such as spark timing in closed loop in response to the sensed engine knock to prevent the engine knock intensity from exceeding a predetermined level. Such engines may be equipped with turbochargers or provided with higher compression ratios or advanced spark timing for greater power and fuel economy with the assurance that engine operating conditions conducive to severe knock will not damage the engine or annoy the vehicle operator.

One of the difficulties involved in the sensing and control of knock in such engines is the signal-to-noise ratio of the sensed knock signal. Knock is generally sensed in such systems by means of an electromechanical vibration or detonation transducer which is physically attached to an engine component to respond to the knock induced ringing vibrations of the engine. However, since the modes and characteristic frequencies of these ringing vibrations are determined by the engine structure and there are many other vibration generating events that occur during the operation of such an engine, prior art methods of signal processing based on simple frequency or amplitude discrimination have rarely been successful in providing commercially acceptable knock control for a mass produced, vehicle mounted engine. Only one such system, described in U.S. Pat. No. 4,111,035, issued to Gene A. West and Glen C. Hamron on Sept. 5, 1978, has shown such commercial success; and even this system, on some engines and under some operating conditions, may occasionally allow a brief burst of excessive knock or respond to noise other than knock and produce a condition known as false retard, the name of which condition is derived from the retard of spark timing which is the means by which excessive knock is reduced when it is sensed.

A superior new system for controlling knock using a demodulator and a low pass filter is described in the copending patent application U.S. Ser. No. 149,645, filed by Herman Brandt on the same date as this application and assigned to the same assignee. This system uses a low pass filter which approximates the impulse response of a matched filter for the envelope of a typical knock burst and provides an improvement in signal-to-noise ratio by suppressing bursts or pulses not due to knock which are characterized by the characteristic knock carrier frequency of the engine and have amplitudes comparable to knock induced pulses but have a different envelope shape over time.

One consistent difference between knock induced and other vibration bursts in such engines is the time duration of the burst. It has been observed that most knock induced pulses, at least for strong or intense knock of the type that requires control, have time durations of approximately three to ten milliseconds, whereas most other engine vibration bursts appear to last for a significantly shorter time. Therefore, after the output of the low pass filter in the aforementioned superior knock control system has been compared with a reference in a comparator to produce well-formed, constant amplitude knock pulses, the signal-to-noise ratio might be improved even more in some cases by the act of ignoring or suppressing all such pulses having a duration less than the lowest normally expected for engine knock. Because of the time extending effect of the low pass filter on all pulses passing therethrough, output pulses from the comparator of less than some duration greater than one millisecond could be ignored. One method which we have developed to accomplish this is to delay the rising edge of each such comparator output pulse by two milliseconds. This will cause all pulses of less than two milliseconds duration to disappear, but it will also shorten all other pulses by the same two millisecond duration. This last effect tends to aggravate another problem of such knock control systems, which is the incompatibility between control of moderate and control of strong knock.

In a knock control system in which engine knock pulses are themselves measured and the duration of such pulses is taken as a measure of the severity of the knock, there is not necessarily a proportional correlation between the durations of said knock pulses and the amount of correction required for the engine control variable which reduces knock. In a system such as that described above, it has been found that the variation in knock pulse duration between moderate, less intense knock and severe, more intense knock is often greater than the variation in required corrections to the spark timing of the engine for reduction of the appropriate knock. More specifically, if the system is adjusted to control moderate knock, severe knock would provide too much spark retard, possibly leading to a noticeable and unnecessary loss of power or surge as the spark is retarded beyond the required amount. However, if the system is adjusted for control of severe knock, the amount of retard for moderate knock is insufficient and such knock may exceed the maximum desired audible level. The use of an ignore timer as described above aggravates this problem by increasing the ratio between time durations of moderate and severe knock bursts or pulses.

SUMMARY OF THE INVENTION

It is therefore an object of this invention to provide a spark ignited internal combustion engine knock control system which provides acceptable control of both moderate and severe knock.

It is a further object of this invention to provide such a knock control system which generates pulses having durations indicative of knock severity and converts those pulses into pulses having durations indicative of required correction.

It is yet another object of this invention to provide such a system which provides superior control of both moderate and severe knock in spite of possible distortions introduced into the knock signal by the apparatus used to increase the signal-to-noise ratio thereof.

These and other objects are realized in a knock control system for a spark ignited internal combustion engine in which means are provided for sensing knock induced vibration bursts in the engine and generating therefrom pulses having durations varying directly with the severity of said knock vibration bursts and apparatus effective to extend the duration of each said pulse by a constant added time duration to reduce the ratio between the shortest and longest durations of said pulses. If apparatus is included to shorten the durations of said pulses by a constant time duration in order to improve the signal-to-noise ratio of said knock pulse signal by suppressing said pulses of less than the subtracted time duration, then the apparatus which adds a constant time duration to each pulse follows the apparatus which subtracts a constant time duration to each pulse and further adds a time duration which is greater than the subtracted time duration. In a preferred embodiment, the invention includes apparatus effective to delay the trailing edge or end transition of each knock pulse by the specified constant duration.

Further details and advantages of this invention will be apparent from the accompanying drawings and following description of a preferred embodiment.

SUMMARY OF THE DRAWINGS

FIG. 3 is a circuit diagram of a preferred embodiment of the apparatus as shown in block diagram form in FIG. 2.

FIG. 4 is a series of time waveforms useful in illustrating the operation of the apparatus shown in FIGS. 1-3.

DESCRIPTION OF A PREFERRED EMBODIMENT

Figure 1:
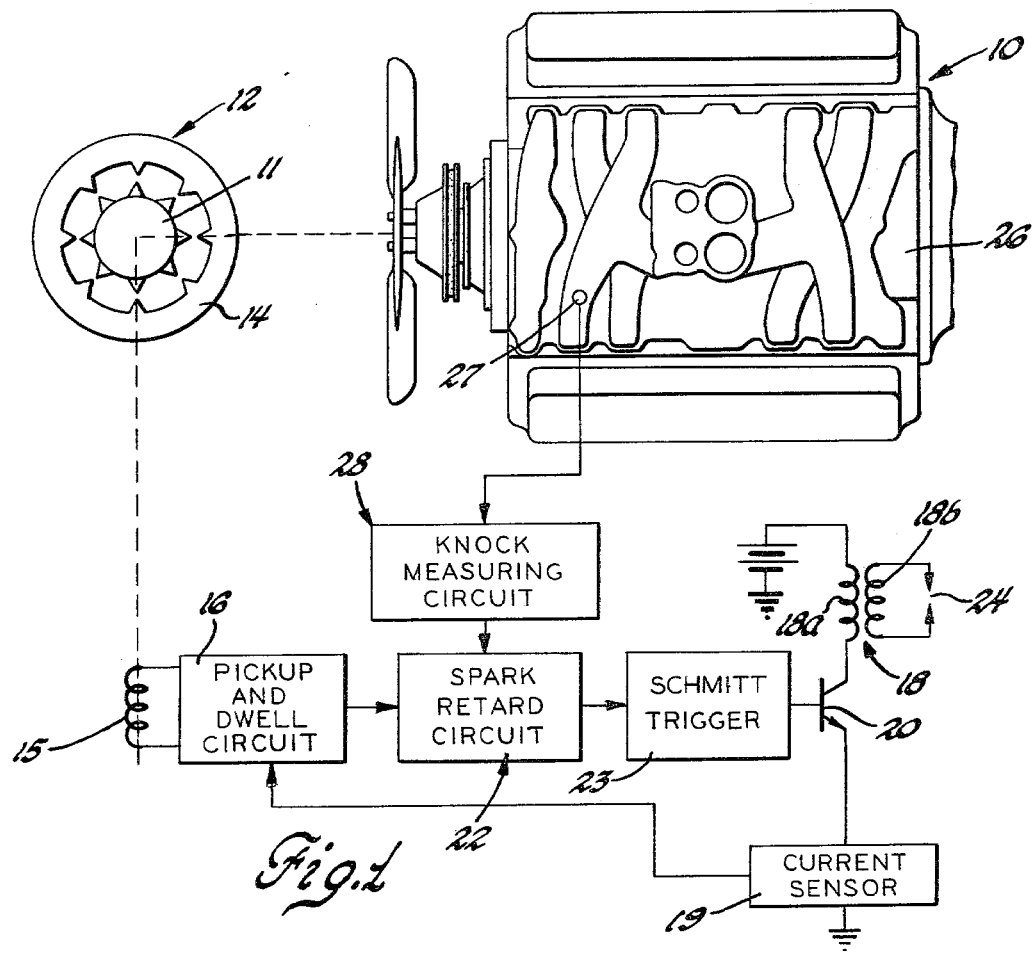
FIG. 1 is a schematic and block diagram of an internal combustion engine having a knock control system according to this invention.

Referring to FIG. 1, an internal combustion engine 10 has a rotating crankshaft which drives the rotor 11 of an alternating current signal generator 12. Generator 12 is a standard spark timing signal generator of the variable reluctance type disclosed and described in U.S. Pat. No. 3,254,247 to Folgy, which issued May 31, 1966. Generator 12 also includes a stator 14 and a pickup coil 15 and provides a plurality of equally spaced projections around rotor 11 and stator 14 related to the number of cylinders in engine 10. Relative rotation between rotor 11 and stator 14 at a speed proportional to engine speed produces a pulsating variation in reluctance which induces an alternating voltage signal in coil 15.

The alternating voltage signal in coil 15 is applied to pickup and dwell circuitry 16, which generates normal spark timing pulses. These normal spark timing pulses could be applied to a Schmitt trigger 23 to control a switching transistor 20 connected to switch current on and off in the primary 18a of spark coil 18. The flow of current in primary 18a causes electromagnetic energy to build up in spark coil 18; and this energy is released, when transistor 20 cuts off current in primary 18a, in the form of a high voltage spark pulse in coil secondary 18b applied to spark plug 24. A current sensor 19 provides feedback to pickup and dwell circuitry 16 to control the dwell time of current conduction in primary 18a. The system so far described is one well known in the art and shown in the U.S. patent to Richards et al U.S. Pat. No. 3,828,672, issued Oct. 1, 1974.

In order to selectively retard the spark timing in response to an engine knock signal, spark retard circuitry 22 is inserted between pickup and dwell circuitry 16 and Schmitt trigger 23. Apparatus suitable for use as such circuitry is shown in the U.S. patent to Gene A. West U.S. Pat. No. 4,106,447, issued Aug. 15, 1978. However, other appropriate spark retard circuits are well known.

Engine 10 is provided with a vibration or detonation sensor 27, which is preferably mounted on the intake manifold 26, engine block, not numbered, or some other component of engine 10. The precise location of sensor 10 is determined by experiment for a particular engine so that it is sensitive to knock from all cylinders of the engine. Sensor 27 includes a threaded stud which is tightened into a threaded depression within a mounting boss formed at the desired location. Vibration sensor 27 thus vibrates physically with the engine or engine component upon which it is mounted and responds to such vibrations in at least its axial direction and possibly in other modes to generate electrical output voltage corresponding to such vibrations. Sensor 27 may be of the type which includes a permanent magnet to generate magnetic flux, an electric pickup coil and a magnetostrictive element within the coil in the path of the magnetic flux to vary the flux with vibration and thus generate the output voltage across the coil. An example of such a vibration sensor is shown in the U.S. Pat. No. 4,161,665, issued to Charles E. Buck et al on July 17, 1979. Alternatively, sensor 27 could be of the piezoelectric variety in which a piezoelectric element is attached to a portion of the sensor case for flexing therewith and thus generates an electrical output voltage as the sensor is vibrated.

The output signal from vibration sensor 27 is provided to knock measuring circuitry 28 in which a knock intensity signal is generated for application to spark retard circuit 22 to control the retard of the spark timing from the normal spark timing. Apparatus for use as knock measuring circuit 28 is shown in block diagram form in FIG. 2 and in circuit form in FIG. 3.

Figure 2:
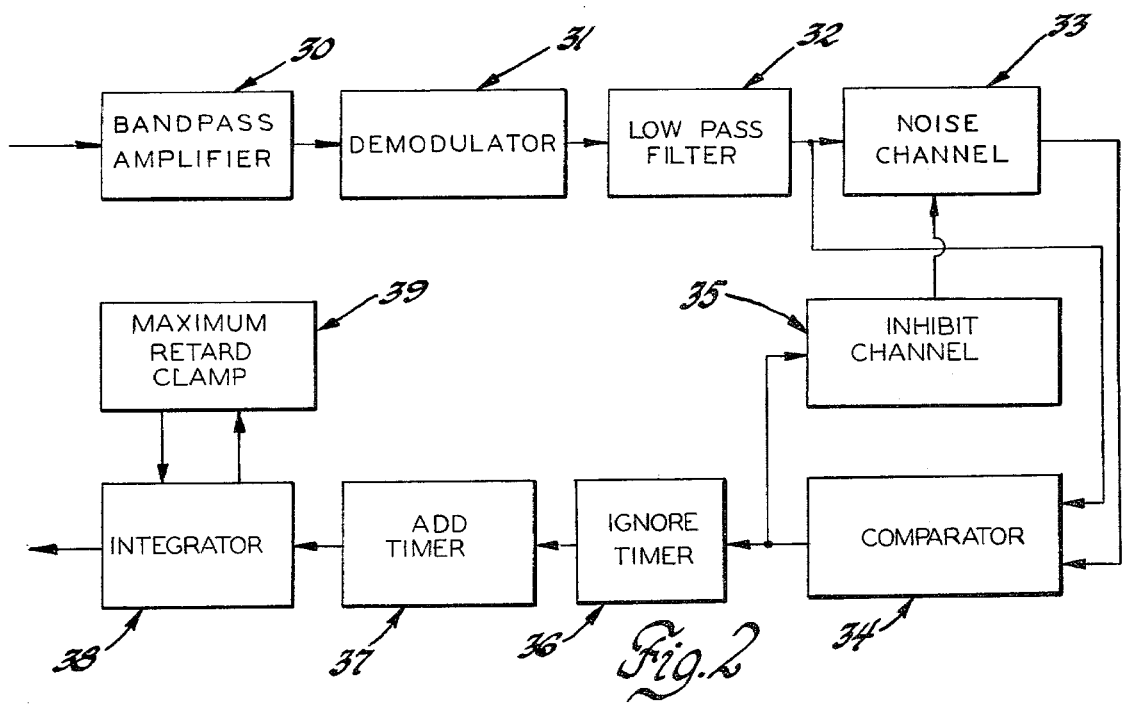
FIG. 2 is a block diagram of apparatus according to this invention suitable for use as the knock measuring circuit of FIG. 1.

FIG. 2 shows a block diagram of knock measuring circuit 28. The input signal from sensor 27 is supplied to a bandpass amplifier 30, which provides the correct amount of amplification to the signal and further filters out very high and very low noise components such as ignition and/or radio frequency signals. The sharpness of the bandpass, the center frequency of the bandpass and the amount of amplification will depend to some degree upon the characteristics of the engine and sensor used, but such dependence is minimized as much as possible. A typical bandpass amplifier 30 has a Q of 0.5 about a center frequency of 6.2 kilohertz and provides approximately 14 dB gain.

The output of bandpass amplifier 30 is provided to a demodulator 31 which extracts the envelopes of the vibration bursts from the six to seven kilohertz carrier wave. The output of demodulator 31 is provided to a low pass filter 32 having a half power frequency in the range of approximately 100 to 200 Hertz. This filter significantly improves the signal-to-noise ratio of the knock signal. A good example of such a filter is a four pole low pass filter having a half power frequency of substantially 131-160 Hertz.

The output signal from low pass filter 32 is supplied to a noise channel 33, which generates a unidirectional voltage signal that generally follows the average voltage of the output of low pass filter 32. The relative levels of the outputs of low pass filter 32 and noise channel 33 are adjusted by suitable amplifier and voltage divider means so that the noise reference signal is maintained at a level below the peaks of the knock induced pulses in the output of low pass filter 32 but above most of the rest of said signal.

The outputs of low pass filter 32 and noise channel 33 are compared in a comparator 34, the output of which assumes one level whenever a pulse in the output signal of low pass filter 32 exceeds the noise reference voltage and assumes another level when it does not. Waveform 34a of FIG. 4 shows a typical output over time of comparator 34. In this example, the output of comparator 34 assumes a high level in the absence of a strong pulse from low pass filter 32. Pulses from low pass filter 32 which exceed the noise reference level, however, cause the output of comparator 34 to switch to a low level and generate pulses 34b, 34c and 34d as shown in FIG. 4. Pulse 34c, the narrowest pulse, is typical of a noise produced pulse which, at this point in the apparatus, is less than the predetermined ignore duration. Pulses 34b and 34d, which are longer in duration, are typical of moderate and heavy knock, respectively.

The output of comparator 34 is fed back through an inhibit channel 35 to noise channel 33. Inhibit channel 35 is similar in purpose and operation to the low pass filter described in the aforementioned West et al U.S. Pat. No. 4,111,035. Its effect is to compensate for the high content of knock signal in a noise channel 33 and thus prevent the output of noise channel 33 from going too high in response to strong knock pulses with consequent reduction in knock control capability.

The output of comparator 34 may further be provided to an ignore timer 36 which converts the leading edge of each output pulse of comparator 34 to a rising ramp voltage which leads, in further apparatus to be described, to the suppression of all pulses of shorter duration than a first predetermined duration such as two milliseconds and the shortening of all other pulses by the same duration, the short pulses eliminated being mostly due to short duration noise vibrations as described earlier. The output of ignore timer 36 is shown in waveform 36a of FIG. 4, which includes pulses 36b, 36c and 36d. Pulse 36c, never rising above the reference voltage line V/2, will be eliminated in the input of the add timer to be described hereinafter. The shortening of each of pulses 36b and 36d increases the ratio of their durations, which has been found to be undesirable for maintaining uniformity of control for knock of varying intensity.

Therefore, in order to obtain the desired ratio of duration between long and short duration knock pulses, the output of ignore timer 36 is provided to an add timer 37 which delays the end of each pulse by a constant time duration such as three milliseconds without affecting the beginning of each pulse, as seen in waveform 37a of FIG. 4 with pulses 37b and 37d. Add timer 37 thus provides a desired ratio between short and long pulses for best control of both light and heavy knock. In an embodiment that does not include ignore timer 36, add timer 37 would be provided directly with the output of comparator 34, although the constant added duration would assume a value which would generally be different and probably smaller than the three milliseconds of this embodiment.

The output of add timer 37 is provided to a fast charge, slow discharge integrator 38, the output of which is a voltage analog of the desired spark retard from the normal spark timing of engine 10.

FIG. 3 shows a circuit diagram of a preferred embodiment of the system shown in block form in FIG. 2. Input terminal 41 is connected through a capacitor 42 and resistor 43 to the inverting input of an operational amplifier or op amp 44, the noninverting input of which is connected through a resistor 45 to an electric power source at voltage V/2. The output of op amp 44 is connected in feedback through a parallel resistor 46 and capacitor 47 to the inverting input. These elements comprise bandpass amplifier 30.

The output of op amp 44 is connected through a series capacitor 50 and resistor 51 to the inverting input of an op amp 52, the noninverting input of which is connected to the electrical power supply at voltage V/2. The output of op amp 52 is connected in feedback to the inverting input through a diode 53 and is further connected to the base of a PNP bipolar transistor 54 having its emitter connected to the inverting input of op amp 52. Diode 53 is oriented with its anode connected to the output of op amp 52. The collector of transistor 54 is connected through a resistor 55 and a diode 56 to ground, the diode 56 being oriented with its cathode connected to ground. These elements comprise demodulator 31.

The collector of transistor 54 is further connected through a resistor 58 to the noninverting input of an op amp 59, which input is also connected to ground through a capacitor 60. The output of op amp 59 is connected through series resistors 61 and 62 to junction 57 between resistor 55 and diode 56. Junction 63 between resistors 61 and 62 is connected through a resistor 64 to the inverting input of op amp 59 and also through a capacitor 65 to the collector of transistor 54.

The output of op amp 59 is further connected through a series pair of resistors 66 and 67 to the noninverting input of an op amp 68, which input is further connected to ground through a capacitor 69. The output of op amp 68 is connected through a series pair of resistors 70 and 71 to junction 57; and the junction 72 between resistors 70 and 71 is connected through a resistor 73 to the inverting input of op amp 68 and through a capacitor 74 to the junction 75 of resistors 66 and 67. Elements 58-75 described above comprise the low pass filter 32. The form of the filter in this embodiment is a pair of cascaded two pole Butterworth filters having identical poles. The outputs of each of the Butterworth filters, as well as that of demodulator 31 and noise channel 33 are referenced to junction 57 at one diode drop above ground so that op amps 59, 68 and 116 will produce a "zero" output for a "zero" input. The filter constructed around op amp 59 takes its feedback from junction 63 so that a voltage gain is provided through the series pair of resistors 61 and 62 to make up for attenuation losses in the filter. The filter constructed around op amp 68 provides a voltage gain similarly through series resistors 70 and 71.

The output of op amp 68 is provided through a resistor 82 to the noninverting input of an op amp 116, which input is further connected through a resistor 117 to a voltage source at voltage V. The output of op amp 116 is connected through a resistor 76 and diode 77 to the inverting input. The inverting input of op amp 116 is connected to the cathode of diode 77 and further through a resistor 78 to junction 57. The inverting input of op amp 116 is further connected through a series resistor 79 and capacitor 80 to junction 57. These elements comprise the noise channel 33, with op amp 116 and diode 77 providing a detecting function and resistor 79 and capacitor 80 comprising a low pass filter with an output from their junction 81.

Junction 81 is connected to the noninverting input of a comparator 83, the output of which is tied through a resistor 84 to the electric power source at voltage V. The inverting input of comparator 83 is connected to junction 72, so that resistors 70 and 71 control the amplitude of the noise reference level, which is the output of noise channel 33, relative to the amplitude of the knock pulses in the signal from filter 32. Comparator 83 and resistor 84 comprise the comparator 34.

The output of comparator 83 is connected through a capacitor 86 and resistor 87 in series to the electrical power source at voltage V, with junction 88 between capacitor 86 and resistor 87 being connected to the anode of a diode 89 having its cathode connected to the power source at voltage V. Junction 88 is further connected to the non-inverting input of a comparator 90 having an inverting input connected to the electrical power source at voltage V/2 and an output connected to a junction 91 between resistor 76 and diode 77. Elements 86 through 90 comprise the inhibit channel 35.

In operation, an input knock signal applied to terminal 41 is amplified and filtered with a broad bandpass characteristic in bandpass amplifier 30, detected in detector 31 and filtered in filter 32. The time average of the output of filter 32 is obtained in noise channel 33 and applied to the noninverting input of comparator 83. The output of filter 32 obtained from junction 72, reduced in amplitude from that obtained at the output of op amp 68 by the voltage divider resistors 70 and 71, is provided to the inverting input of comparator 83. Thus, in the absence of a large pulse such as 32c or 32d in FIG. 4, the output of comparator 83 is high and comparator 90 thus has no effect on junction 91 of noise channel 33. When a pulse in the signal from junction 72 exceeds the noise reference output of channel 33, however, the output of comparator 83 falls to a low level. Capacitor 86 causes the noninverting input and output of comparator 90 to fall with the output of comparator 83, which reverse biases diode 77 to prevent the noise channel voltage from being greatly increased by the same pulse coming through the knock channel 33. Capacitor 86 begins to charge immediately, however, so that the output of comparator 90 rises to once again forward bias diode 77. Diode 89 provides a quick discharge path for capacitor 86 when the output of comparator 83 switches high again.

The output of comparator 83 is connected to the inverting input of a comparator 93, the noninverting input of which is connected to the electric power source at voltage V/2. The output of comparator 93 is connected through a resistor 94 to the power source at voltage V, through a capacitor 95 to ground and directly to the inverting input of a comparator 96, the noninverting input of which is connected to the power source at voltage V/2. Elements 93–95 comprise ignore timer 36.

The output of comparator 96 is connected through a resistor 97 to the power source at voltage V, through a capacitor 98 to ground and directly to the inverting input of a comparator 99. Comparator 99 has a noninverting input connected to the power source at voltage V/2 and an output connected through a resistor 100 to the power source at voltage V. Elements 96–100 comprise the add timer 37.

In operation, a downward swing of the voltage output of comparator 83, which indicates the beginning of a knock pulse, causes the output of comparator 93 to attempt to swing high. However, there is a time delay caused by the charging of capacitor 95, characterized by a first time constant, before this voltage, which is applied to the inverting input of comparator 96, can swing up above voltage V/2. When it does, the output of comparator 96 swings low immediately and causes the output of comparator 99 to swing high. Thus, a delay is introduced by ignore timer 36 to the leading edge of a knock pulse. This is shown in waveform 96a of FIG. 4, which includes pulses 96b and 96d having leading edges delayed by two milliseconds from those of pulses 36b and 36d. It should also be observed that pulse 36c has been eliminated.

When the output of comparator 83 swings high again, the output of comparator 93 immediately swings low and the output of comparator 96 attempts to swing high. In this case, however, a time delay is introduced by the charging of capacitor 98, which is characterized by a second time constant longer than the first; and the following swing of the output of comparator 99 low is thus delayed. Therefore, a time delay is introduced by add timer 37 at the end of a knock pulse. Waveform 96a of FIG. 4 shows the conversion of the trailing edge of each pulse not eliminated by comparator 96 to a rising exponential voltage, as seen in pulses 96b and 96d. This voltage crosses reference voltage V/2 three milliseconds after the beginning of the rise and delays the trailing edges of the pulses as seen in waveform 37a.

The output of comparator 99 is connected to the base of a bipolar NPN transistor 102 having a grounded emitter and a collector connected through a resistor 103 to the inverting input of an op amp 104. Op amp 104 has a noninverting input connected through a resistor 105 to the electric power source at voltage V/2 and an output connected through a parallel resistor 106 and capacitor 107 back to the inverting input. These elements comprise the integrator 38, with a fast charging path for capacitor 107 during a knock pulse through transistor 102 and resistor 103 and a slower discharge path for capacitor 107 during the absence of a knock pulse through resistor 106. The output of op amp 104 comprises an output terminal 108 for knock measuring circuit 28 with the knock voltage measured in the positive direction relative to V/2.

The output of op amp 104 is further connected to the noninverting input of an op amp 110, which has an inverting input connected through a resistor 111 to electric power source at voltage V/2 and through a resistor 112 to the electric power source at voltage V. The output of op amp 110 is connected back to the inverting input through a capacitor 113 and through a series diode 114 and resistor 115 to the inverting input of op amp 104, the diode oriented with its anode connected to the output of op amp 110. These items comprise the maximum retard clamp 39. In operation, when the output voltage of op amp 104, which is also the knock retard voltage, reaches the reference voltage on the inverting input of op amp 110, op amp 110 turns on and supplies current to the inverting input of op amp 104 through diode 114 and resistor 115. This current passes through transistor 102 and decreases the current drawn from capacitor 107 so that the output of op amp 104 does not increase further. With this method of clamping there is no overcharging of capacitor 107; and the output of op amp 104 is able to begin falling immediately at the end of a knock pulse. A list of parts and component values for use in the embodiment described above follows:

| Capacitors | Transistors |
|---|---|
| 42-390μμF | 54-2N3906 |
| 47-33μμF | 102-2N4401 |
| 50-0.1μF | |
| 60,65,69,74-0.068μF | |
| 80-2.7μF | |
| 86,98-0.022μF | |

-continued

| | |
|---|---|
| 95-0.01μF | |
| 107-4.7μF | Comparators |
| 113-22μμF | 83,90,93,96-LM2901 |
| Resistors | |
| 43-75K | |
| 45,46-680K | |
| 51-3.65K, 1% | |
| 55,58,66.67-14.7K, 1% | |
| 61-750 | Op Amps |
| 62-1.24K, 1% | 44,52-LM1458 |
| 64,73-30K | 59,68,116-LM2904 |
| 76,84,100-10K | 104,110-LM2902 |
| 78-68K | |
| 79-51K | |
| 87-750K | |
| 111-20K, 1% | |
| 112-29.4K | |
| 115-470 | Diodes |
| 117-475K, 1% | all 1N485B |

In addition, certain resistors may vary in value as the circuit is calibrated for a particular engine. Resistors 70, 71 and 82 determine the noise channel gain relative to the signal strength for application to the inputs of the comparator 34; resistor 94 determines the time delay of the ignore timer; and resistor 97 determines the time delay of the add timer. Finally, resistors 103 and 106 determine the relative charge and discharge rates of the integrator 38, while resistor 105 should be the same as resistor 106. Sample values for a Buick turbocharged V-6 3.8 L engine are: resistor 70—787, 1%; resistor 71—1.21 K, 1%; resistor 82—4.53 K, 1%; resistor 94—432 K, 1%; resistor 97—232 K, 1%; resistor 103—17 K, 5%; resistors 105, 106—750 K, 5%.

Since the original development of this invention, which was done using a one pole low pass filter for filter 32, it has been discovered that longer ignore and add times may be appropriate, at least on some engines, with the four pole filter described herein. Values of seven milliseconds ignore time and eight milliseconds add time have shown improvement on some engines. However, these longer times are entirely consistent with and within the scope of this invention.

It may also be desirable, in some engine control systems, to computerize the application of this invention. For example, the output pulses of comparator 34 could be converted to digital numbers representative of the pulse durations and input to appropriate digital computing apparatus. The subtraction of a constant first predetermined ignore number from each input duration number would be the equivalent of the ignore timer in its broadest sense. This could be followed by the addition of a second, larger, predetermined add number to each remaining (i.e., non-zero) duration number. This would correspond to the add timer in its broadest sense. The modified duration numbers would then be supplied to a look-up table or used in an equation to determine a fast attack or integration rate in a digital integration process or apparatus corresponding to integrator 38. Of course, the step of adding the second predetermined add time could be merged into the integrator rate computation or performed beforehand by the designers in the calculation of values for the look-up table, which would then be addressed on the basis of the numbers obtained from subtraction of the first predetermined ignore number.

The embodiments of the invention in which an exclusive property or privilege is claimed are defined as follows:

1. In combination:
a vehicle mounted, spark ignited internal combustion engine of the type which occasionally exhibits bursts of knock induced engine vibrations, the knock induced vibration bursts being of varying intensity and being characterized by durations varying directly with said intensity;
first means effective to sense the knock induced vibration bursts and generate pulses having durations varying directly with the durations of the bursts;
second means effective to lengthen selected ones of the pulses by a common predetermined duration, whereby the ratio of durations between the shorter pulses indicating less intense knock and the longer pulses indicating more intense knock is decreased; and
third means effective, at least at some times, to control a knock reducing parameter of said engine in response to the lengthened pulses to limit knock intensity, whereby the reduced ratio of duration between shorter and longer pulses provides more effective control of both less and more intense knock.

2. In combination:
a vehicle mounted, spark ignited internal combustion engine of the type which occasionally exhibits bursts of knock induced engine vibrations, the knock induced vibration bursts having durations varying directly with knock intensity;
first means responsive to the knock induced vibration bursts to generate pulses having durations between the leading and trailing edges thereof which vary directly with the durations of the bursts;
second means effective to delay the trailing edge of selected ones of said pulses by a common, predetermined duration, whereby the pulses are lengthened and the ratio of durations of the shorter pulses indicating less intense knock to the longer pulses indicating more intense knock is reduced; and
third means effective under some engine operating conditions, to control a knock reducing parameter of the engine in response to the lengthened pulses to limit knock intensity, whereby the reduced ratio variation in pulse duration provides effective control for knock of varying intensity.

3. In combination:
a vehicle mounted, spark ignited internal combustion engine of the type which occasionally exhibits knock induced and other bursts of ringing vibrations, the knock induced bursts being generally characterized by durations greater than those of the other bursts and further exhibiting durations varying directly with knock intensity;
first means effective to sense the knock induced and other vibration bursts and generate, in response thereto, pulses having leading and trailing edges separated by durations varying directly with the durations of the bursts;
second means effective to delay the leading edge of each pulse by a common first predetermined duration, whereby shorter pulses mostly indicating other vibration bursts are eliminated and, with regard to the longer, mostly knock indicating pulses each shortened by the common, predetermined duration, the ratio of durations between shorter pulses due to less intense knock and longer pulses due to more intense knock is increased;

third means effective to delay the trailing edge of each pulse not eliminated by the second means, the delay having a common second predetermined duration longer than the first common predetermined duration, whereby the ratio of durations between shorter pulses due to less intense knock and longer pulses due to more intense knock is decreased to a greater degree than it was increased by the last means; and fourth means effective under some engine operating conditions to control a knock reducing parameter of the engine in response to the pulses generated by the third means to limit knock intensity in vehicle operation, whereby effective control of knock having varying intensity is maintained.

4. In combination:

a vehicle mounted, spark ignited internal combustion engine of the type which occasionally exhibits knock induced and other bursts of ringing engine vibrations, the knock induced bursts generally having longer durations than the other bursts and further exhibiting durations varying directly with knock intensity;

first means effective, in response to the knock induced and other bursts of ringing engine vibrations, to generate pulses having durations corresponding with those of the bursts;

second means responsive to said pulses and effective to generate a first output voltage during said pulses and a second output voltage in the absence thereof;

a first comparator having one input adapted to receive pulses from the second means, another input referenced to a third voltage intermediate the first and second voltages and an output connected through a first resistor to an electric power source at the first voltage and through a first capacitor to an electric power source at the second voltage, said first capacitor being characterized by a first time constant, whereby the leading edge of each pulse is converted to an exponentially changing voltage;

a second comparator having one input adapted to receive pulses from the first comparator output, another input referenced to the third voltage and an output connected through a second resistor to the electric power source at the first voltage and through a second capacitor to the electric power source at the second voltage, said second capacitor being characterized by a second time constant longer than the first time constant, whereby pulses having durations less than a first predetermined duration are eliminated and each other pulse has a leading edge delayed by the first predetermined duration from that of the corresponding pulse supplied to the first comparator and further has a trailing edge converted to an exponentially changing voltage;

a third comparator having one input adapted to receive pulses from the second comparator output, another input referenced to the third voltage and an output connected through a resistor to the electric power source at the first voltage, whereby each pulse received by the third comparator has a trailing edge delayed by a second predetermined duration longer than the first predetermined duration from that of the corresponding pulse supplied to the first comparator; and third means effective to control, at some times, a knock reducing parameter of the engine in response to the pulse output of the third comparator to limit knock intensity in vehicle operation, whereby the other bursts of vibration are ignored and effective control of knock having varying intensity is maintained.

5. The method of controlling a vehicle mounted, spark ignited internal combustion engine of the type which occasionally exhibits bursts of knock induced engine vibrations, the knock induced engine vibration bursts being of varying intensity and being characterized by durations varying directly with said intensity, the method comprising the steps:

sensing the knock induced vibration bursts and generating signals corresponding thereto, each signal having a parameter varying directly with the durations of the bursts;

increasing the parameter of selected ones of said signals by a common predetermined amount, whereby the ratio of parameters between the signals corresponding to short vibration bursts and the signals corresponding to long vibration bursts is decreased; and controlling a knock reducing parameter of the engine in response to said increased signals to limit knock intensity, whereby the reduced ratio of signals corresponding to shorter and longer vibration bursts provides more effective control of both less and more intense knock.

6. The method of controlling a vehicle mounted, spark ignited internal combustion engine of the type which occasionally exhibits bursts of knock induced engine vibrations, the knock induced vibration bursts being of varying intensity and having durations varying directly with said intensity, the method comprising the steps:

sensing the knock induced vibration bursts and generating signals corresponding thereto, each signal having a parameter varying directly with the duration of the burst;

decreasing the parameter of each of said signals by a first common predetermined amount and thereafter ignoring those signals originally having parameters of less than said first common predetermined amount;

increasing the parameter of each of those signals not ignored by a second common predetermined amount greater than said first common predetermined amount, whereby the ratios of parameters between the signals corresponding to short vibration bursts and the signals corresponding to long vibration bursts is decreased; and controlling a knock reducing parameter of the engine in response to said increased signals to limit knock intensity, whereby the reduced ratio of signals corresponding to shorter and longer vibration bursts provides more effective control of both less and more intense knock.

* * * * *